United States Patent [19]

Waldecker et al.

[11] Patent Number: 4,899,218

[45] Date of Patent: Feb. 6, 1990

[54] VEHICLE WHEEL ALIGNMENT APPARATUS AND METHOD

[75] Inventors: Thomas J. Waldecker, Ypsilanti; Robert Dewar, Troy; David R. Wybo, Novi; Richard Woroniec, West Bloomfield Township, Oakland County, all of Mich.

[73] Assignee: Perceptron, Inc., Farmington Hills, Mich.

[21] Appl. No.: 194,495

[22] Filed: May 16, 1988

Related U.S. Application Data

[63] Continuation of Ser. No. 15,943, Feb. 18, 1987, Pat. No. 4,745,469.

[51] Int. Cl.⁴ .............................................. H04N 7/18
[52] U.S. Cl. .................................... 358/93; 29/273; 33/288; 356/155; 358/107
[58] Field of Search ................... 358/93, 101, 107; 356/155; 33/288; 29/273

[56] References Cited

U.S. PATENT DOCUMENTS

| | | | |
|---|---|---|---|
| 4,109,387 | 8/1978 | Matsuoka | 29/273 |
| 4,130,362 | 12/1978 | Lill | 33/288 |
| 4,319,838 | 3/1982 | Grossman | 356/155 |
| 4,639,878 | 1/1987 | Day | 358/107 |
| 4,647,208 | 3/1987 | Bieman | 358/101 |
| 4,745,469 | 5/1988 | Waldecker | 358/107 |

*Primary Examiner*—Howard W. Britton
*Attorney, Agent, or Firm*—Harness, Dickey & Pierce

[57] ABSTRACT

Noncontact sensors project fanned or structured light onto the tire, while the wheel is rotated, to illuminate at least two contour lines on the surface of the tire. the contour lines are read by video cameras, positioned offset from the optical plane of the structured light, to allow triangulation in determining the spatial position of the contour lines. Radially equivalent points are selected from each contour line by an algorithm which ignores the effects of any raised lettering on the tire sidewalls. Control of the video cameras and processing of the video data is performed by parallel processor-based computer system coordinated by sequencer circuit.

3 Claims, 15 Drawing Sheets

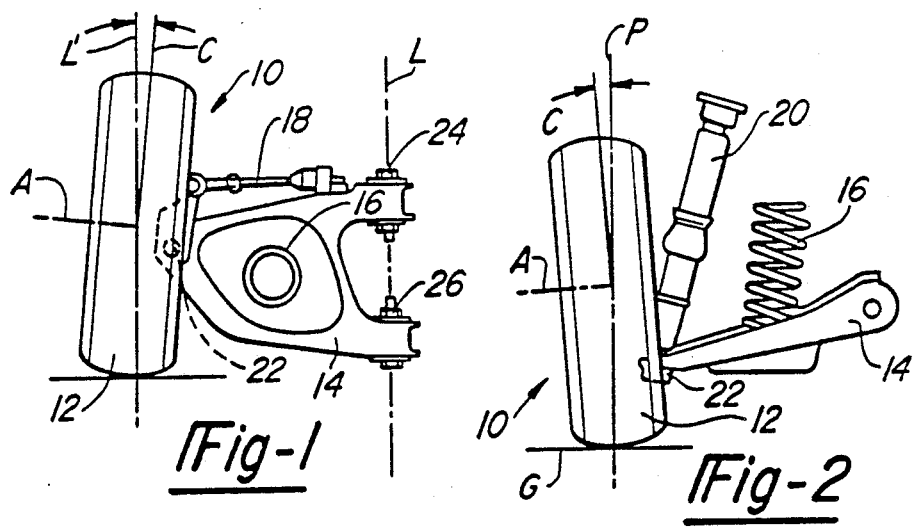
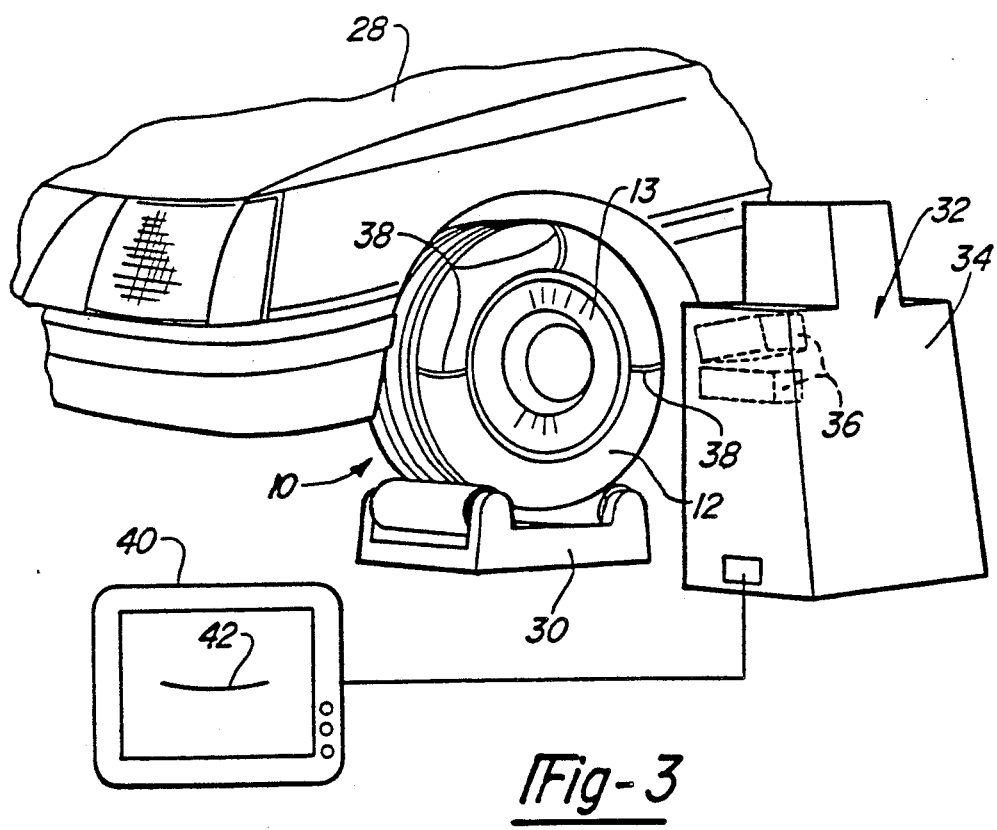

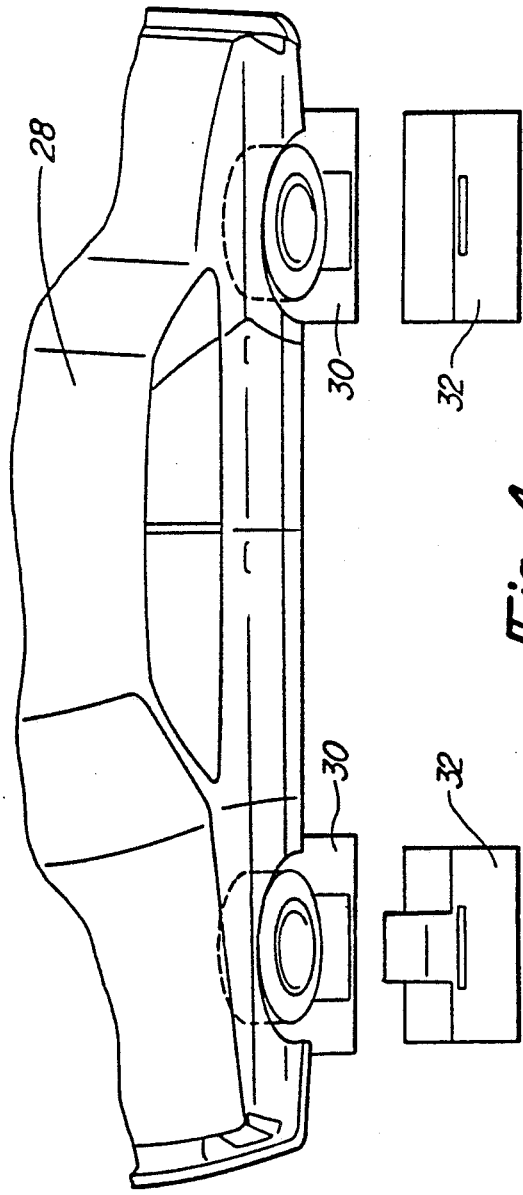
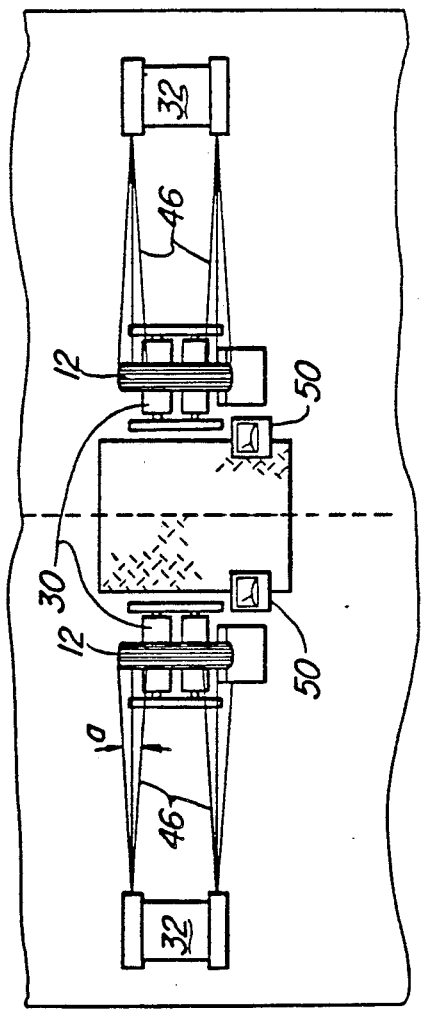
Fig-4
Fig-5

VEHICLE WHEEL ALIGNMENT APPARATUS AND METHOD

This is a continuation of U.S. Pat. application Ser. No. 015,943, filed Feb. 18, 1987, now U.S. Pat. No. 4,745,469.

BACKGROUND AND SUMMARY OF THE INVENTION

The present invention relates generally to vehicle wheel alignment. The invention relates more specifically to a noncontact wheel alignment sensor and method for aligning a vehicle wheel which eliminates the need to attach an apparatus to the vehicle or to physically contact the wheel to be aligned.

The automotive industry, in recent years, has become increasingly interested in improving the quality of its vehicles, while at the same time seeking more efficient manufacturing procedures. One area of great potential for improvement is in verifying and adjusting wheel alignment settings.

Present day wheel alignment inspection is cumbersome and relies heavily on direct contact measuring devices to obtain a reading of whether the wheel is properly aligned. Aside from being cumbersome, conventional wheel alignment verification and adjusting techniques suffer a number of other shortcomings. These shortcomings are in part attributable to difficulty in obtaining an accurate measurement due to variations in tire and wheel size, variations in tire type, variations in vehicle weight and wheel base and variations in vehicle drive method and placement of the inspection stations. Other factors, perhaps equally important, are wear on the testing apparatus over time and distortion of the tire profile caused by the direct contact of measuring tools.

If a high quality product is to be consistently produced, such parameters as wheel alignment must be carefully monitored during the manufacturing process. Preferably the accuracy of an alignment system should equal or exceed the manufacturing specifications and should be easy to use on the assembly line. Present day alignment equipment is generally deficient in one or both of these regards.

Even after the vehicle leaves the assembly line and is placed in service, there is a need for periodic inspection and adjustment of the wheel alignment settings. Proper wheel alignment can be lost if the vehicle is involved in a collision or even through normal service on bumpy roadways. Improper wheel alignment is a major contributing factor in tire wear and should therefore be periodically checked. Ideally, when a vehicle is brought in to a dealer or service station for wheel alignment, the alignment settings should be returned to the original factory specifications. Thus the dealer or service station must also have accurate alignment equipment which is capable of meeting factory specifications.

The present invention provides an apparatus and method for measuring and effecting wheel alignment in which the position and angular orientation of the wheel, tire or other desired reference point integral with the wheel is determined without physical contact. Measurements are performed by a self-contained, intelligent machine vision camera and illumination system which includes a laser source for projecting a plane of light onto the wheel, tire or other integral part of the wheel. A solid-state television camera precisely located within the camera illumination unit or sensor module, at a perspective angle relative to the axis of the projected light plane, produces image signals representing the light pattern or contour on the surface of the wheel or tire, as viewed from such perspective angle. The invention thus provides a noncontact means for measuring wheel position with no moving parts.

Control circuitry within the sensor module (camera illumination unit) transmits the image signals in response to commands from an attached machine vision computer. The computer converts these signals into digital form and stores them as an organized array of digital values representing an analog image. The machine vision computer processes the image, using prestored calibration data or n-th order polynomial transformations and preprogrammed algorithms to compute the three-dimensional position of specific reference points on the imaged object. Multiple sensor modules, rapidly sequenced by the machine vision computer, permit essentially simultaneous measurements to be made at two or more points on each wheel or tire. With these data points, the rotational plane of the wheel can be calculated. This wheel position information can be combined with similarly measured data defining the vehicle center line or other desired references and the complete vehicle alignment geometry can be analyzed and dynamically displayed on a meter or the like to guide an operator in adjusting or setting the wheel alignment. The system provides a fast response time to the operator making the adjustment while viewing the meter, through rapidly sequenced operation and hardware assisted data point location and other techniques discussed below. Alternatively, the results of the geometric alignment analysis can be transmitted digitally to an automatic mechanism for performing the same operations. The analysis can also be used for quality control testing on an assembly line by providing an indication of any misaligned wheels and also providing a printout of each wheel's actual alignment settings, if desired.

In accordance with the inventive method of aligning a vehicle wheel, structured light is projected in a plane onto the surface of a member integral with the wheel, such as the tire. This structured light illuminates at least two contour lines on different portions of the wheel. The contour lines are then optically read using an optical sensor disposed at a viewing angle offset from the plane of the structured light and data points are collected to indicate the position of the contour lines. At least one datum point associated with each of the contour lines is located corresponding to radially equivalent points (radially equidistant from the axis of rotation of the wheel) on the surface of the wheel. For example, an annular surface of the tire closest to the light projecting laser may be selected as the position from which the points are taken. Using the individual datum points so located, the position of the wheel is determined and an indication of the wheel position relative to a desired position is given to an operator. Thereafter the wheel position may be adjusted based on the indication, in order to bring the wheel into alignment with the desired position.

For a more complete understanding of the invention and its many objects and advantages, reference may be had to the following specification and to the accompanying drawings.

BRIEF DESCRIPTION OF THE DRAWINGS

FIG. 1 is a plan view of an exemplary wheel with integral tire and associated suspension system useful in explaining toe-in alignment;

FIG. 2 is a rear view of the wheel, tire and associated suspension system of FIG. 1 useful in explaining chamber;

FIG. 3 is a perspective view of the invention shown in conjuction with the left front wheel and tire of an exemplary vehicle;

FIG. 4 is a top perspective view of the invention and exemplary vehicle, illustrating sensor placement;

FIG. 5 is a diagrammatic top view of the invention illustrating the left and right front sensors;

BRIEF DESCRIPTION OF THE PREFERRED EMBODIMENTS

Figure 6:
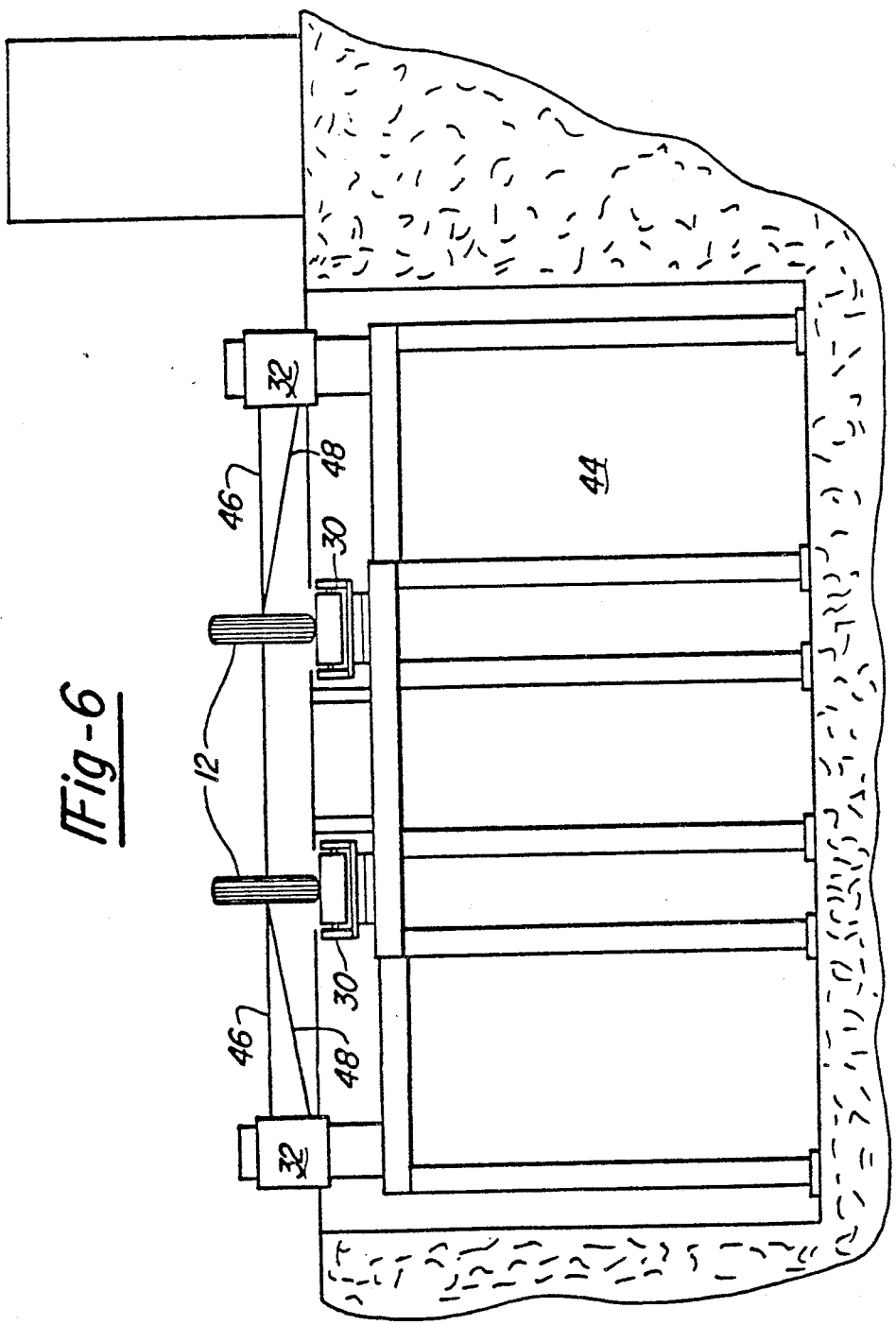
FIG. 6 is a diagrammatic front view of the invention illustrating the left and right front sensors.

The present invention provides a noncontact sensor useful in measuring wheel alignment. In FIGS. 1 and 2 an exemplary left front wheel is illustrated generally at 10. In FIGS. 1 and 2 the tire 12 is illustrated. The tire is integral with wheel 10 so that both may rotate about the same axis of rotation A. Wheel 10 defines a medial plane C which is perpendicular to axis of rotation A. In addition to the tire 12, the wheel may also have other integral members, such as a wheel cover, hubcap or the like. Unless otherwise specified, the term "wheel" is used generically herein and in the accompanying claims to refer to the unsprung rotating mass of the vehicle, including but not limited to the metal wheel, brake rotor, tire, wheel cover, hubcap and the like.

FIGS. 1 and 2 further depict exemplary components of the front suspension system. FIGS. 1 and 2 thus depict the suspension control arm 14, suspension spring 16, tie-rod 18, shock absorber 20 and ball joint 22. In FIG. 1 the front most part of the vehicle is at the top of the page. In FIG. 2 the tire 12 rests upon the ground line G. The spatial position of the wheel (and its integral components such as tire 12) may be defined in relation to the ground line G and a longitudinal line L which passes through two fixed points on the vehicle. For convenience, longitudinal line L is shown extending through the front and rear bolts 24 and 26 which attach the control arm to the vehicle chassis. The ground line G, in turn, defines a perpendicular line P illustrated in FIG. 2.

Figure 22A:
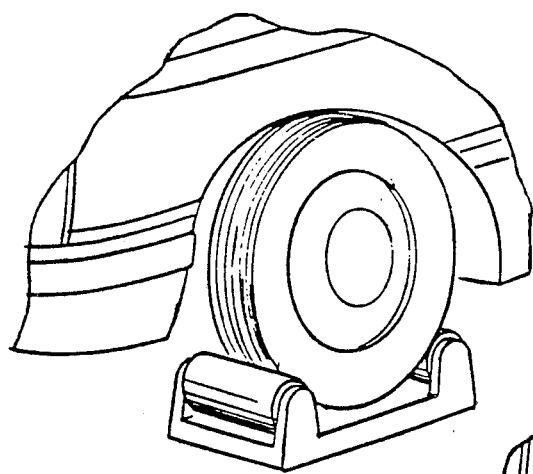
FIGS. 22A and 22B illustrate a wheel at two different steered orientations for purposes of explaining caster angle.
Figure 22B:
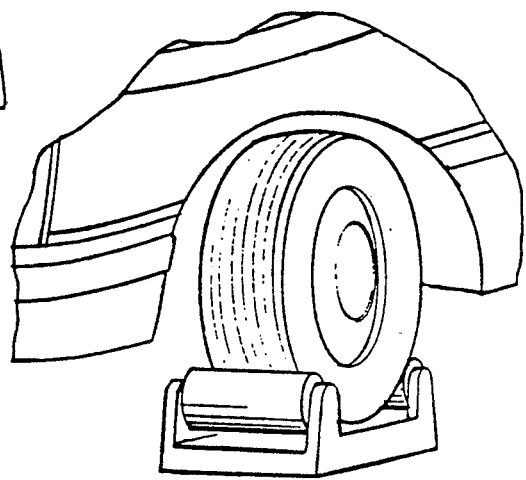
Figure 23:
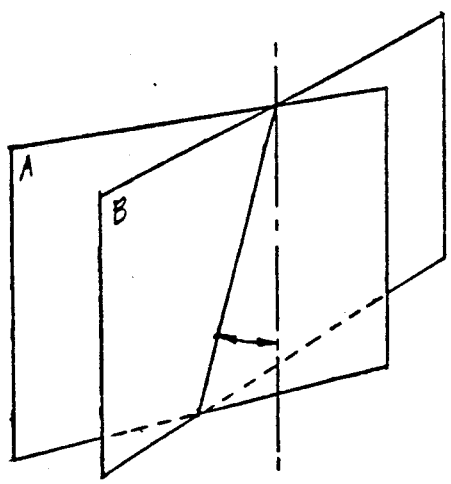
FIG. 23 is a sketch depicting the intersection of the planes of the wheels of FIGS. 22A and 22B, useful in explaining caster angle.

The position of wheel 10 may be determined in relation to the longitudinal line L and the perpendicular line P. In FIG. 1, a second longitudinal line L' is drawn parallel to longitudinal line L so that it passes through wheel axis A. The angle between longitudinal line L' and the center plane C establishes the toe-in of the wheel. A positive wheel toe-in is illustrated in FIG. 1. Wheel positions which place the center plane C counterclockwise of longitudinal line L' in FIG. 1 would yield a negative toe-in. Similarly, in FIG. 2, the angle between the center plane C and the perpendicular line P establishes the wheel camber. A positive camber is illustrated in FIG. 2. A negative camber would result if the center plane C is clockwise of perpendicular line P as seen in FIG. 2. Referring to FIGS. 22A and 22B, when the wheel 10 is turned during steering, the plane passing through the wheel rotates in a plane which defines an angle with respect to the vertical known as the caster angle. FIGS. 22A and 22B illustrate wheel 10 in two different steered orientations. The plane of the wheel in FIG. 22A is designated at $C_1$ and the plane of the wheel in FIG. 22B is illustrated at $C_2$. The intersection of planes $C_1$ and $C_2$ is illustrated in FIG. 23 and defines a line designated K. This line defines an angle with respect to the vertical P which is known as the caster angle. The caster angle is determined by the orientation of the steering system kingpin about which the wheel is turned when steering the vehicle.

The toe-in, camber and caster measurements of the wheel are important in establishing proper wheel alignment. The present invention provides method and apparatus for measuring these and other wheel and vehicle suspension and steering parameters. The toe-in may be adjusted by means of the threaded joint of the connector on tie-rod 18.

The present invention employs a noncontact sensor arrangement without moving parts for determining the spatial position of the wheel and its associated tire and other integral components. The invention employs a laser light source for projecting structured light which in the preferred embodiment is directed onto the sidewall of the tire. A video optical sensor disposed at a viewing angle offset from the plane of the structured light detects the illuminated contour line or lines on different portions of the tire and these contour lines are used to construct a computer memory image. The computer memory image is interpreted by alogrithms which give the wheel position and compare that position with a desired wheel position. The apparatus and method may be used while the wheel is rotating (i.e., dynamic wheel alignment), which has the advantage of averaging the wheel position measurement over time to give more consistent results. The invention may also be adapted for stationary wheel measurement techniques (i.e., static wheel alignment), if desired. Significantly, the present invention does not require the attachment of reflective devices to the wheel or tire. This adds to the accuracy of the invention, since unwanted variations in reflector attachment is of no concern.

As it is the more difficult of the two alignment schemes to implement, the preferred embodiment of the present invention described herein represents a dynamic wheel alignment system. Modification to a static wheel alignment system, however, is readily achievable. FIG. 3 illustrates an exemplary vehicle 28 with left front wheel 10 and tire 12 visible. Wheel 10 includes an integral wheel cover 13 in FIG. 3, although the invention may be practiced with the wheel cover removed. Tire 12 rests on a roller track 30 which allows the wheel to rotate about its axis. In a dynamic wheel alignment system, the roller track is motorized for rotating the wheel at a predetermined speed (e.g., equivalent to a vehicle speed of 30 miles per hour.) Alternative means of rotating the wheel may be provided. Positioned at a station adjacent roller track 30 is a noncontact sensor station 32. The sensor station includes a housing 34 which protects one or more sensor modules 36 and associated electronic components yet to be discussed. Each sensor module, discussed more fully below, includes a laser light source and video camera sensor with associated imaging lenses and interface electronics. The sensor modules each project structured light in at least one plane onto the sidewall of the tire 12. The term "structured light" means light which is projected in a predetermined geometric pattern and may include both coherent (laser) and noncoherent light. In the presently preferred embodiment, the structured light comprises a flat plane formed by optically fanning a laser beam. Other structured light configurations are also usable.

The structured light projected onto the sidewall of tire 12 shows up as illuminated contour lines 38. Three such contour lines are shown in FIG. 3. These may be projected using three sensor modules within housing 34. Each of the illuminated contour lines is viewed by a video camera within the associated sensor module. The video cameras produce video images of the contour lines as seen from the offset vantage point or offset viewing angle of the video camera sensors relative to the laser light sources. For illustration purposes, a video monitor 40 is depicted in FIG. 3. On the screen of monitor 40 appears a contour line image 42 which is exemplary of the type of image received by the video camera of one of the sensor modules 36. This contour line image is processed by digital computer circuitry of the invention to determine the position of the wheel. This processing is accomplished largely without human intervention and the monitor 40 is not required. Monitor 40 and the contour line image displayed on it are illustrated in FIG. 3 to aid in understanding the invention.

In some applications, it is considered desirable to be able to monitor all four wheels of a vehicle at one wheel alignment station. Such an arrangement is illustrated in FIG. 4, which illustrates left front and left rear noncontact sensor stations 32 positioned adjacent the associated roller tracks 30. A vehicle 28 is shown in position on the roller tracks.

FIGS. 5 and 6 diagrammatically illustrate an exemplary alignment station using the invention. For illustration purposes only the tires 12 of the vehicle are shown in FIGS. 5 and 6. The exemplary alignment station is constructed over a pit 44 for allowing workers to access the underside of the vehicle or for placement of robotic equipment. Noncontact sensor stations 32 are positioned on both left and right sides of the vehicle, as illustrated.

FIG. 5 shows the fanned laser beams 46 which project generally horizontal contour lines upon the associated tires in both fore and aft positions. In contrast with the illustration of FIG. 3 (which shows three projected contour lines), FIGS. 5 and 6 depict the projection of only two structured light planes onto each tire. Both light patterns are in a generally horizontal plane. This arrangement is appropriate for measuring the toe-in angle. The generally vertically arranged plane of structured light shown in FIG. 3 is used to check camber and is not shown in FIGS. 5 and 6.

Referring to FIG. 5, each laser beam plane 46 subtends an arc "a" which is sufficient to project a contour line across a portion of the tire surface. FIG. 6 depicts the plane 46 of each laser beam in relation to the viewing angle 48 of the video optical sensor located in the associated sensor module of each sensor station 32. As seen from FIG. 6, the viewing angle 48 is offset from the laser plane 46. This offset allows the use of triangulation in determining the position of the wheel from its reflected contour lines. These triangulation calculations are performed by the associated digital computer and can provide a readout to the worker for use in adjusting the toe-in alignment, for example. Readouts in the form of analog meters 50 are illustrated in FIG. 5. Digital readouts may also be employed. In addition, the data produced by the invention can be recorded and compared with predefined tolerances for quality control and record maintenance purposes and may also be used to control robotic equipment.

Figure 7:
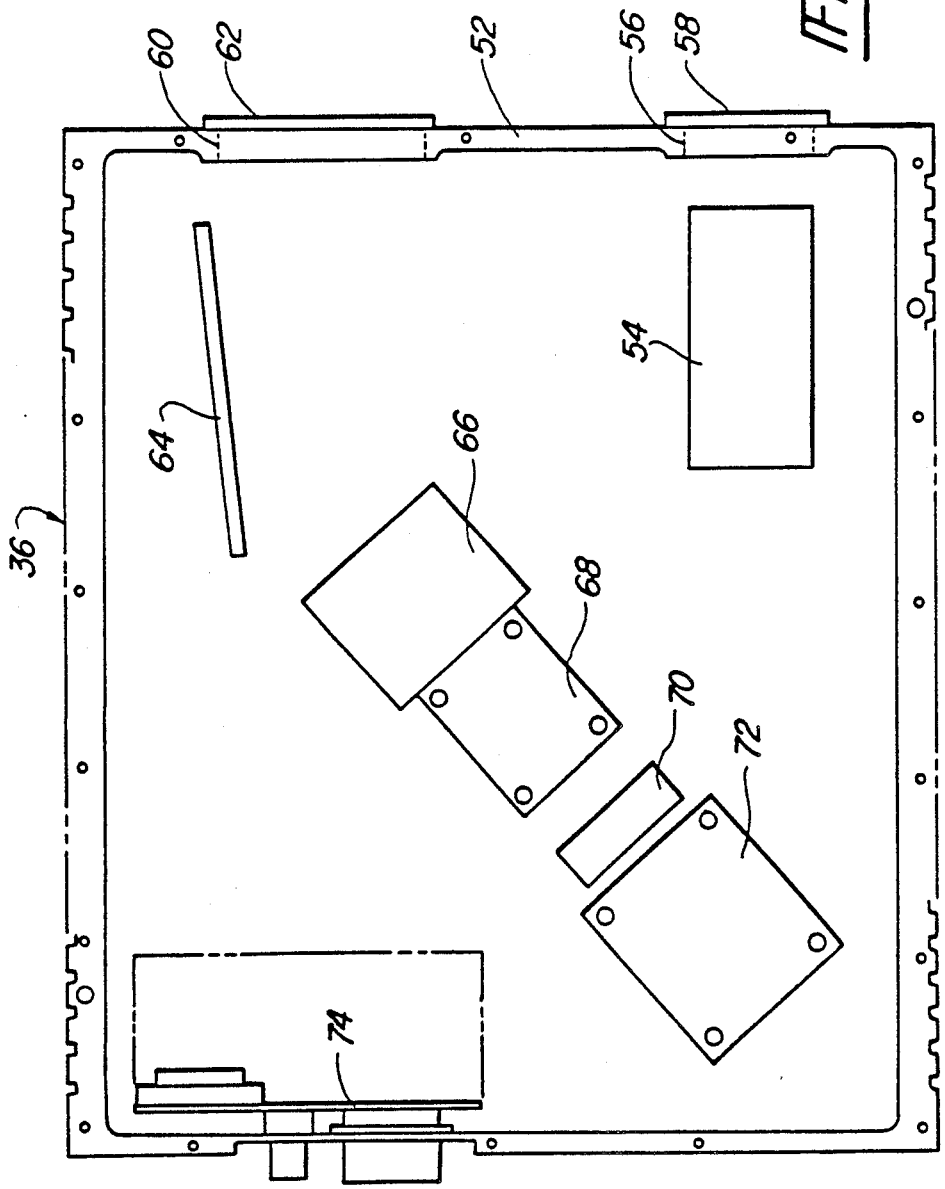
FIG. 7 illustrates one of the sensors of the invention in greater detail.

A sensor module 36 is illustrated in detail in FIG. 7. The components of the sensor module are housed in a metal cabinet or box 52 which has a finned exterior surface for heat dissipation. Cabinet 52 has a lid which has been removed in FIG. 7 to show the internal components. A laser diode assembly 54 is positioned adjacent a laser window 56 which is covered with a glass plate 58. On the same wall of cabinet 52 is an imaging window 60 which is covered by glass plate 62. The laser diode assembly produces an optically fanned light plane using optics of the type described in U.S. Pat. No. 4,645,348. Positioned within cabinet 52 adjacent the imaging window is a base leg mirror 64. The mirror is positioned so that light entering through the imaging window enters an anamorphic lens 66. The anamorphic lens has a first focal length along one axis and a different focal length along a second orthogonal axis. The anamorphic lens thus produces expanded resolution in one plane and compressed resolution in another plane. This gives one magnification along the axis orthogonal to the length of the contour line and different magnification along the axis parallel to the length of the contour line.

By positioning the anamorphic lens properly, the plane of greater focal length and thus higher magnification is aligned generally perpendicular to the length of the imaged contour line. Positioned behind the anamorphic lens is an imaging lens 68 which projects through an interference filter 70 into the video camera assembly 72. Also housed within cabinet 52 are the interface electronics 74 which couple between the video camera assembly and the digital computer equipment yet to be discussed. The above-described optical arrangement provides a suitable field in both the y and z directions, while maintaining sufficient resolution to compensate for the wide variation in vehicle track, wheel size and tire section.

Figure 8:
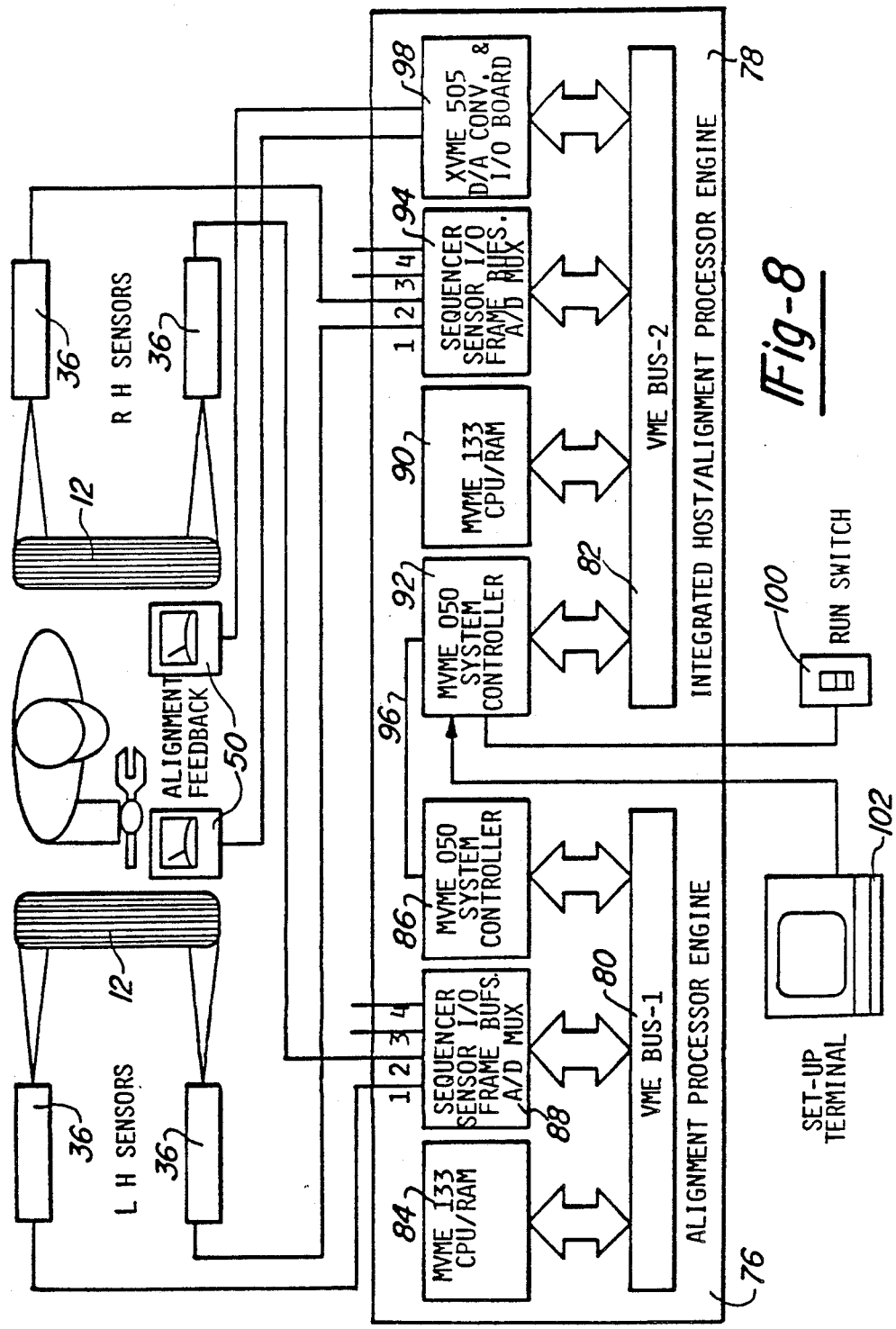
FIG. 8 is a block schematic diagram of the invention illustrating the control circuitry and machine vision computer and illustrating the system bus architecture.

Referring now to FIG. 8, a general computer system overview will be given. In FIG. 8 four sensor modules 36 are illustrated, two for the right front wheel and two for the left front wheel. It will be understood that the same arrangement could be provided for the left and right rear wheels if desired. Also illustrated are two analog meters 50 which the worker may use to set the toe-in alignment. The presently preferred computer system is built around a Motorola VME bus architecture, although other buses, such as the Multibus II, may also be used. The computer system interface comprises an alignment processor engine 76 and an integrated host/alignment processor engine 78. Processor engines 76 and 78 employ separate VME buses 80 and 82, respectively. Connected to the VME bus 80 is an MVME133 processor board 84 which has a 68020 microprocessor, a 68881 coprocessor, one megabyte of RAM and 128 kilobytes of EPROM. Also connected to VME bus 80 is an MVME050 system controller board 86. The system controller board provides serial and parallel input/output ports and sufficient EPROM memory to store the main operating program of the invention. A sequencer board 88 is also coupled to the VME bus 80. The sequencer board will be described in greater detail below. It provides two frame memories, analog to digital conversion circuits and the necessary electronics for controlling the sensor modules 36. As illustrated, the sequencer 88 of the presently preferred embodiment has four inputs, two of which are unused in the exemplary configuration of FIG. 8. The remaining two inputs (designated 1 and 2) are connected to the four sensor modules 36. The processor board 84, system controller board 86, sequencer board 88 and VME bus 80 together comprise the alignment processor engine 76.

The integrated host/alignment processor engine 78 is of similar construction. An MVME133 processor board 90, and MVME050 system controller board 92 and sequencer board 94 are coupled to the VME bus 82. These components perform essentially the same functions as the corresponding components of the alignment processor engine 76. As illustrated, sequencer board 94 has its first two inputs coupled to the aft sensor module 36. The system controller boards 86 and 92 of engines 76 and 78 are coupled together via link 96 in order to establish synchronization between the two engines. In addition, the integrated host/alignment processor engine 78 further comprises an XVME505 digital to analog converter board 98, which provides four channels of digital to analog conversion for driving up to four alignment meters 50. The system controller board 92 is configured as the master controller. A run switch 100 is connected to controller 92 for enabling the system. In addition, a setup terminal 102 may be connected to controller 92 for use in initial setup and calibration of the system. The operation of the system after initial installation and setup requires only that the system be turned on or off through run switch 100. The terminal 102 is optional.

The digital computer system thus described functions as the vision computer employing two fully functional alignment processor engines 76 and 78. The processor engines operate synchronously as parallel processors to allow the system to efficiently process the four images needed for the toe-in alignment task. The processor engines are coordinated by the integrated host computer which forms a part of the alignment processor engine 78. The sequencer boards 88 and 94 control the respective sensor modules 36 and store the necessary video images in onboard frame memory circuits. The sequencer boards contain analog to digital conversion circuitry for digitizing the received images. These digitized images are then manipulated by algorithms, yet to be discussed, by the central processing unit of the associated processor boards 84 and 90. The results of this analysis are converted into a computer generated angle measurement which is sent through the analog output of the digital to analog conversion board 98 to the meters 50.

While the example illustrated in FIG. 8 represents a presently preferred embodiment, it will be recognized that other configurations are also possible, depending in part upon what type of information is desired. If simultaneous data of both left and right wheels is not required, the embodiment may be reduced to a single alignment processor engine with the sequencer polling the four sensor modules via its four inputs (1, 2, 3 and 4) in succession. If camber information is required, an extra sensor module can be positioned to project structured light in a generally vertical plane (as illustrated in FIG. 3). This extra sensor module can be connected to one of the four sensor ports through which the additional camber information can be received. Furthermore, if desired, a sensor can be positioned to illuminate a portion of the vehicle body or chassis to establish the overall vehicle orientation relative to the wheels. This type of information may be useful in developing and aligning four wheel steering systems, for example. The system can also be used to measure the caster of the steering system, that is, the fore/aft inclination of the kingpin around which the wheel is pivoted for steering. In general, the illustrated embodiment provides eight video channels via sequencer boards 88 and 94. These channels can be used to measure a variety of different parameters on the vehicle.

Figure 9:
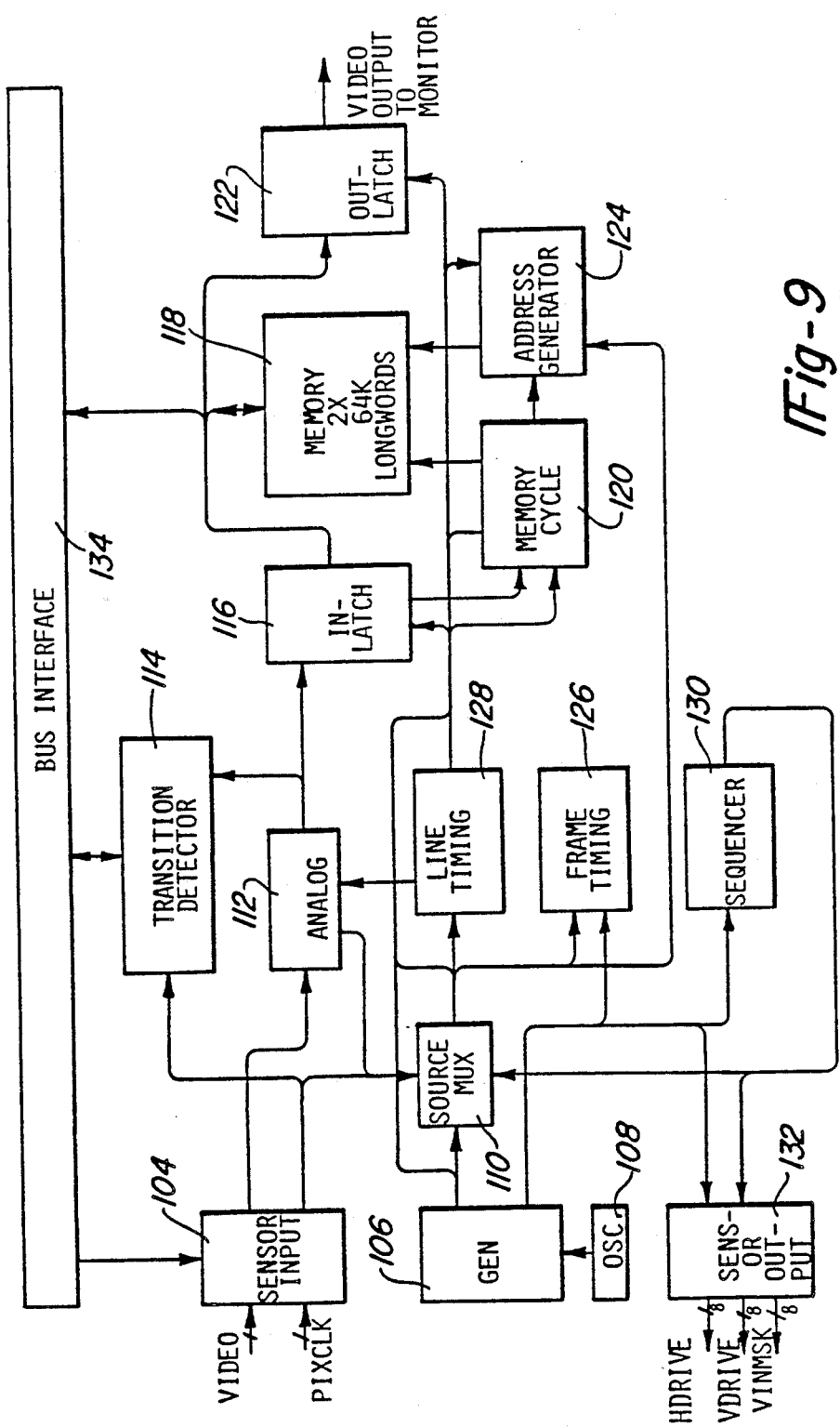
FIG. 9 is a block schematic diagram of the sequencer circuit of the invention.

The details of the sequencer board are illustrated in FIG. 9. The sequencer circuit comprises a sensor input circuit 104 which provides the interface to the associated sensor module 36. The sensor input 104 provides eight channels each of analog RS-170 video and continuous pixel clocks. One of eight of each is multiplexed and passed on to the rest of the circuit. A generator circuit 106, with associated oscillator 108 generates all of the necessary signals to synchronize all sensors. Generator 106 also generates the signals needed to operate the circuit in absence of a sensor. The sensor input circuit and generator circuit supply signals to a source multiplexing circuit 110. The source multiplexing circuit multiplexes between the generator circuit and the sensor input circuit sections to supply all of the necessary signals to run the circuit. The source multiplexing circuit also arbitrates between the signals needed for frame grab mode and frame display mode. The sensor input circuit 104 is also coupled to an analog to digital conversion circuit 112 which receives one of the eight selected video signals from the sensor input section 104 and processes and digitizes that video signal into a signal representing 256 shades of gray. In order to speed processing, a transition detector circuit 114 is provided. The transition detector circuit communicates with the VME bus and also monitors the incoming video signal on a pixel by pixel basis. It records the column in which certain programmable parameters are met and it then records the row that this column value was a maximum (or minimum). The recorded row-column value is then read by the software to determine the optimum spot to begin processing. The transition detector circuit thereby eliminates the time it would otherwise take to locate the object of interest in the field of view. The output of analog to digital converter circuit 112 is fed to inlatch circuits 116. This circuit buffers four consecutive eight bit bytes into one 32 bit long word to be written to video memory 118. The video memory circuit 118 contains two 256 kilobyte blocks of memory arranged as 64 K by 32 bits each. At any one time, one memory block may be written to by a frame grab process or by the VME bus, or it may be read from in a video display cycle or by the VME bus cycle. Arbitration and control of the two memory blocks is done by the memory cycle section 120. An outlatch circuit 122 receives the 32 bit read resulting from a video display cycle and sends it as four, eight bit bytes, one byte at a time to a digital to analog converter for driving a monitor display thereby providing a human viewable image of the memory image residing in the selected memory location.

The memory cycle section 120 controls the memory circuits 118, arbitrating among the video acquisition and display and the VME bus access. This section allows for random access by the bus of either memory block while the video acquisition or display cycle is in operation. An address generator circuit 124 generates consecutive addresses during a video cycle (acquisition or display) and multiplexes them with the random accesses always available to the bus.

The sequencer circuit further comprises a frame timing circuit 126. The frame timing circuit takes signals from either the generator circuit 106 or the sensor input circuit 104 and brackets the frame in the manner necessary for video acquisition or display. A line timing circuit 128 also takes signals from either the generator circuit or the sensor input circuit and brackets the line in the manner necessary for the video acquisition or display. In order to ensure that the frames are in proper sequence, a sequencer circuit 130 is provided. The sequencer circuit 130 controls the sensor integration time and ensures that the frames come in proper sequence, so that a second frame can be acquired while a first frame is being processed by the software. Coupled to the sequencer circuit 130 is a sensor output circuit 132 which interfaces the control signals generated by the sequencer board 94 to the sensor modules 36. The sequencer output circuit provides the necessary drive capability for driving long cables between the computer system and the sensors. Finally, a bus interface 134 provides the means by which the central processing unit of the alignment processor engine controls and configures the sequencer board 88 (and 94). The bus interface also provides the ability for the central computer to read either of the two frame memories.

In operation, the sequencer board controls the sensor modules 36 and channels the data received from the modules at the appropriate time to the frame storage unit comprising the two complete frame memory blocks 118. One of the frame memory blocks is loaded with a new frame by hardware, while the other frame memory block is being processed by the software. The sequence over which this may occur is depicted in the sequence timing diagram of FIG. 10.

The sequencer board is capable of handling up to eight sensor modules in the presently preferred embodiment. In the presently preferred embodiment, up to five sensor modules can be operated in a high speed mode (typically four sensor modules are operated in the high speed mode for toe-in alignment). Each sensor module is driven by a vertical and horizontal sync signal and a VINMSK signal, discussed below, which makes the five sensors in the high speed mode run synchronously with their valid frames coming one after another.

Figure 10:
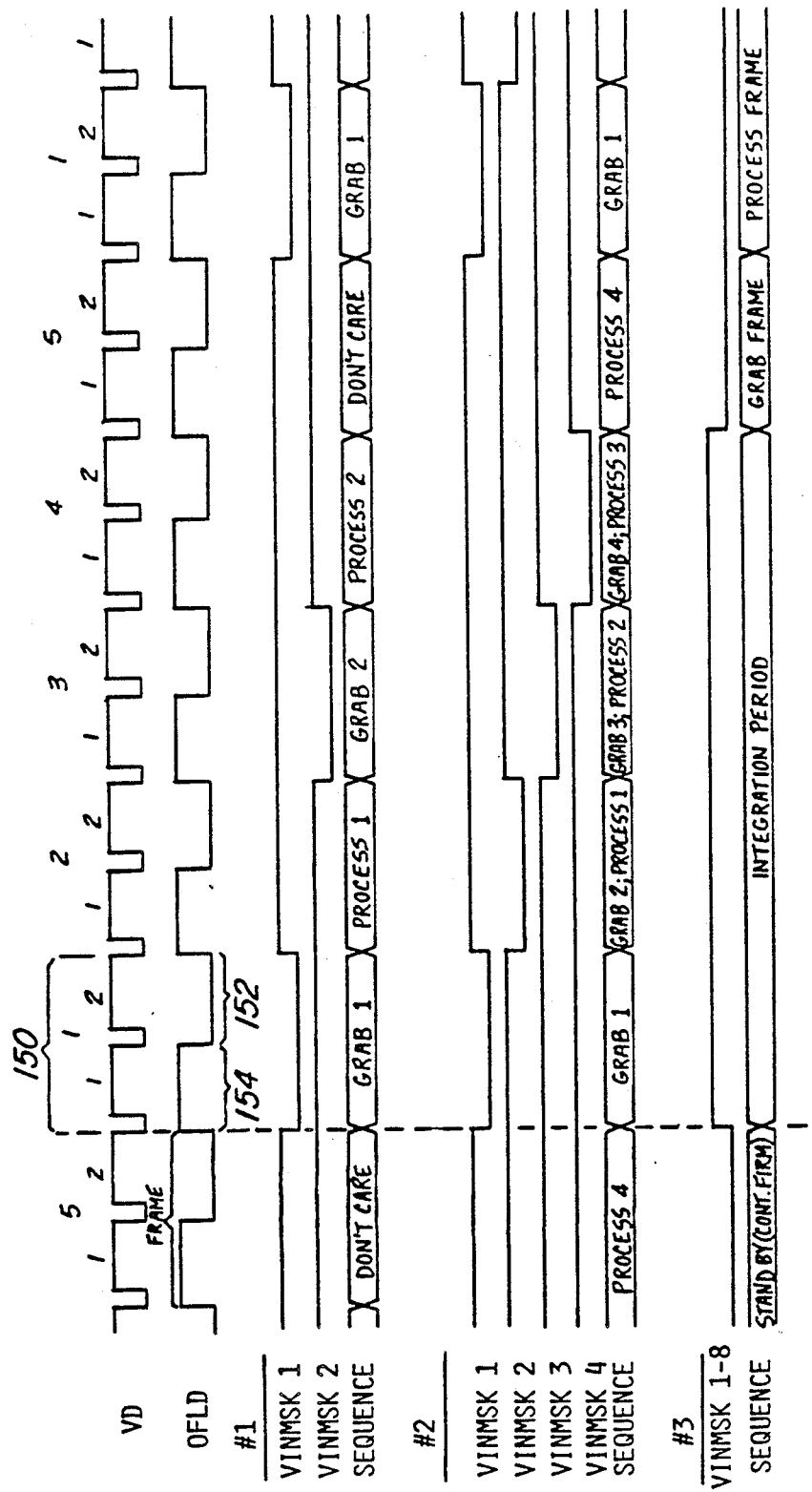
FIG. 10 is a timing diagram useful in explaining the frame sequencing operation of the sequencer circuit.

FIG. 10 depicts three different possible frame sequencing schemes (designated #1, #2 and #3) which may be implemented using the invention. The video frames are shown in relation to the vertical drive signal VD and the odd field signal OFLD appearing at the top of FIG. 10. As seen, each frame 150 is subdivided into an even field 152 and an odd field 154. The even and odd fields correspond, respectively, to the plurality of even and odd scan lines which make up the complete video frame.

To allow the plurality of sensor modules to operate synchronously and sequentially, the generator circuit 106 provides a series of timing signals designated VINMSK. The VINMSK signal is applied to the video camera and allows the camera to collect charge in response to the incoming optical image when the VINMSK signal is at logical high. When the VINMSK signal is at logical low, the camera video data is read out. Using this technique the camera is made to integrate the optical image over time, eliminating any data aberrations as wheel rotates. In the preferred embodiment, the camera video data is read out once for each revolution of the wheel so that wheel wobble and surface irregularities in the tire sidewall are averaged out. By properly sequencing the plurality of VINMSK signals, the sensor modules can be made to collect and relay image data in a sequential or otherwise coordinated fashion.

In the frame sequence illustrated at configuration #1 two VINMSK signals are illustrated. This configuration is appropriate for the four sensor toe-in alignment measurement system depicted in FIGS. 5 and 6, for example. For purposes of illustration, it will be assumed that the sequence commences at time t=0, as indicated by the dotted line on FIG. 10. At time t=0 VINMSK 1 goes low, allowing a first frame of video data to be grabbed or read from the associated sensor module. This is indicated on the SEQUENCE line under configuration #1. In the next ensuing frame VINMSK 1 goes high, allowing the associated sensor to again collect charge for the next read cycle. During this frame, the data read during the preceding frame is processed by steps yet to be discussed. In the third frame following time t=0, VINMSK 2 goes low, causing a different sensor to be read, designated as grab 2 on the SEQUENCE line. In a similar fashion, during the fourth frame the data read during the third frame is processed. The fifth frame following time t=0, is available for further processing of data accumulated during previous frames, if necessary.

Because of the dual memory block circuits 118, the sequencer is capable of grabbing one frame and storing it in one of the memory block circuits while processing a previously acquired frame stored in the other memory block circuit. In configuration #2 of FIG. 10, four VINMSK signals go low during four out of five successive frames. During the first frame following time t=0, data is read from a first sensor while all other sensors continue collecting charge. In the second frame following t=0, a second sensor is read while the data acquired during the first frame is processed using the dual memory capability of the sequencer. In the third frame, a third sensor is read while the data accumulated during the second frame is processed, and so forth until the fifth frame, during which time the fourth accumulated data frame is processed but no new data is at that time read. It will be understood, however, that the invention is capable of continually reading and processing data, in which event the fifth frame would also initiate a new read out cycle.

The configuration #3 of FIG. 10 may be considered as a random access mode. The random mode can begin on any even frame boundary, in contrast with the high speed modes (#1 and #2) which always begin at frame 1. The random mode may be used to access sensor modules that do not require high speed processing, as for example, a sensor used to check or audit the camber of the wheel or to check the position of the vehicle body.

Figure 11:
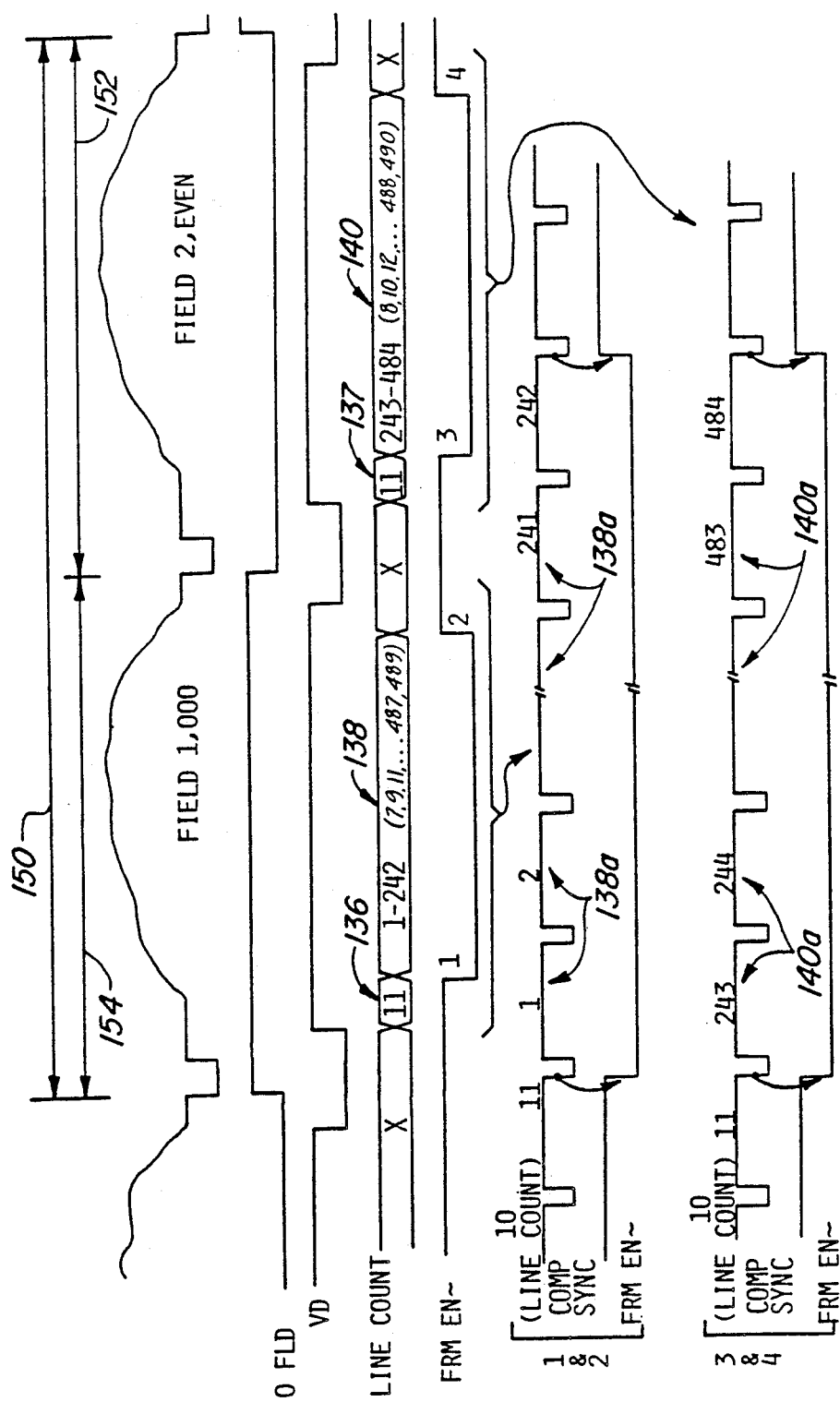
FIG. 11 is another timing diagram useful in explaining the video framing operation of the sequencer circuit.

Referring now to FIG. 11, the frame sequence is shown in greater detail. The time scale of FIG. 11 is enlarged relative to that of FIG. 10, such that a single frame 150 fills the entire Figure. FIG. 11 illustrates the act of grabbing one frame, e.g., frame 150. Frame 150 comprises an odd field 154 and an even field 152. The vertical drive signal VD and the odd field signal OFLD are also depicted in FIG. 11 for reference. Because a video frame contains a certain number of lines above and below the normal viewing area, the frame timing circuit 126 counts these lines in order to bracket the frame to the proper lines for video acquisition or display. The LINE COUNT in FIG. 11 gives the number of video lines and their relationship to the frame enable signal FRM EN~. The frame enable signal (FRM EN~) is active low and is produced by the generator circuit 106. The presently preferred video camera 72 outputs a predetermined number of lines, nominally 11 lines, prior to sending the even and odd fields of a normally viewable video frame. These 11 lines are indicated at locations 136 and 137 on the LINE COUNT portion of FIG. 11. Following the first 11 lines are the odd video lines of the odd field (designated at 138). Following the second 11 lines are the even video lines of the even field (designated at 140). To properly select or bracket the odd lines and even lines representing valid video data to be digitized, the frame enable signal FRM EN~ is low only during the intervals corresponding to intervals 138 and 140 in FIG. 11. The nondata lines at the top and bottom of any given video frame, as well as the retrace time are thus ignored by the timing circuitry.

Below the frame enable line FRM EN~ in FIG. 11 appears two enlarged views designated 1 and 2 and 3 and 4. These enlarged views illustrate individual odd lines 138a and individual even lines 140a bracketed by the composite sync pulses COMP SYNC~.

Figure 12:
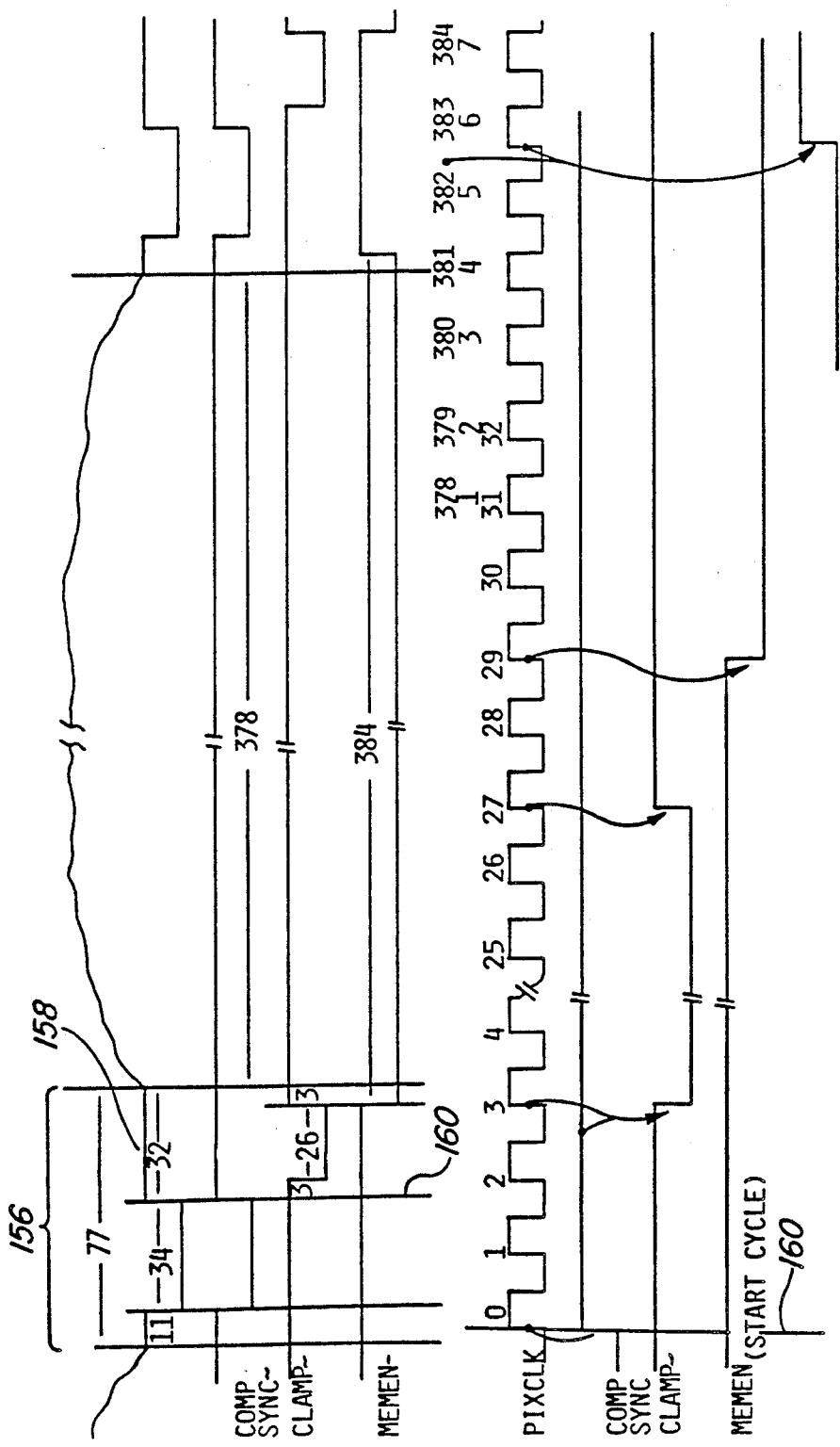
FIG. 12 is a timing diagram useful in explaining the line bracketing operation of the sequencer circuit.

FIG. 11 having shown the manner in which a frame is bracketed, FIG. 12 shows the manner in which an individual line within the frame is bracketed. FIG. 12 depicts the video signal VIDEO which includes a retrace interval 156 with blanking interval 158. Just as the frame includes a number of lines before and after the valid video data region, each line contains a number of pixels which must be counted and ignored. Specifically, during the retrace interval 156, the pixels contain no valid information and can be ignored. The line timing circuit 128, using the rising edge 160 of the composite sync signal COMP SYNC~ as the zero reference point from which timing is established. The pixels occur in syncronism with a pixel clock signal generated by the video camera. The line timing circuit counts the number of pixel clocks occurring after the zero reference point 160 to determine where the beginning of the valid data for the line occurs. The presently preferred video camera has a predetermined number of pixel clocks during the blanking interval, nominally 32 clocks, which are shown (as 3-26-3) on the CLAMP~ line in FIG. 12. The next 378 pixels occurring after the blanking interval 158 correspond to valid data within that line. With reference to the memory enable line MEM EN~ it will be seen that the memory into which the line is stored is enabled three pixels prior to the end of the blanking interval. This allows the circuit to actually digitize three pixels during the blanking interval, in order to give the circuit a reference reading of optical black. Optical black is not a zero value on the A to D converter, but actually a value of three or four. Thus taking this reading of the optical black gives a reference for light intensity digitizing. In the presently preferred embodiment, the circuit reads three pixels of optical black on each side of the video line for a total of 384 pixels per line.

In the lower portion of FIG. 11, an expanded time view is given in which each pixel clock pulse is shown on the line designated PIX CLK. This shows the relationship of the pixel clock to the composite sync signal COMP SYNC, a clamp signal CLAMP~ and the memory enable signal MEM EN, both at the start of the cycle and at the end of the cycle, separately. Pixels are counted in relation to the zero reference line 160 as illustrated. The digitizing of optical data occurs continuously in the A to D converter. The MEM EN signal allows the digitized information to be written to memory 118. The clamp signal CLAMP~ is used to clamp the front porch of the video signal to a known DC reference level to which the intensity information may be related.

Figure 13:
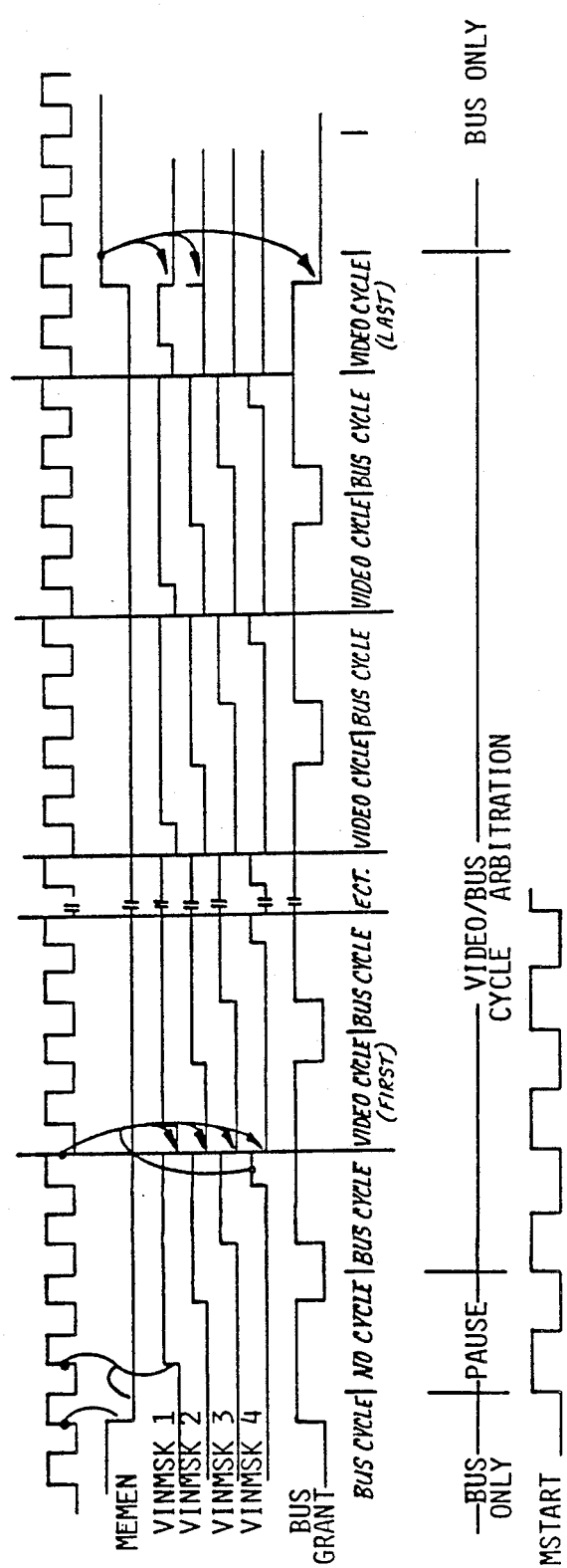
FIG. 13 is a timing diagram depicting the video/bus arbitration scheme of the sequencer circuit.

Referring now to FIG. 13, the manner in which the memory circuit is shared between the video cycle and the bus cycle is depicted. FIG. 13 shows the memory enable signal MEM EN, for VINMSK signals, the BUS GRANT signal and the memory start signal MSTART. Digitized video is read into memory or out of memory four bytes at a time. The video cycle and bus cycle arbitration is set up so that in any four pixel times (560 ns), the circuit will permit one video cycle in the first two pixel times and one bus cycle in the last two pixel times. The video cycle has the highest priority so that if a bus cycle is requested, it is serviced in the latter half of the overall cycle. FIG. 13 depicts this arbitration scheme in the range denoted video/bus cycle arbitration. During the retrace interval, when it can be assured that no video is being read, the bus has control of the entire cycle. This is indicated in FIG. 13 in the ranges denoted "bus only." Also illustrated in FIG. 13 is a range denoted "pause," which occurs during the retrace interval so that no video cycle will occur and in which no bus cycle has been requested. Using this bus arbitration scheme, the invention is able to achieve a worst case bus access time of 560 ns.

Figure 14:
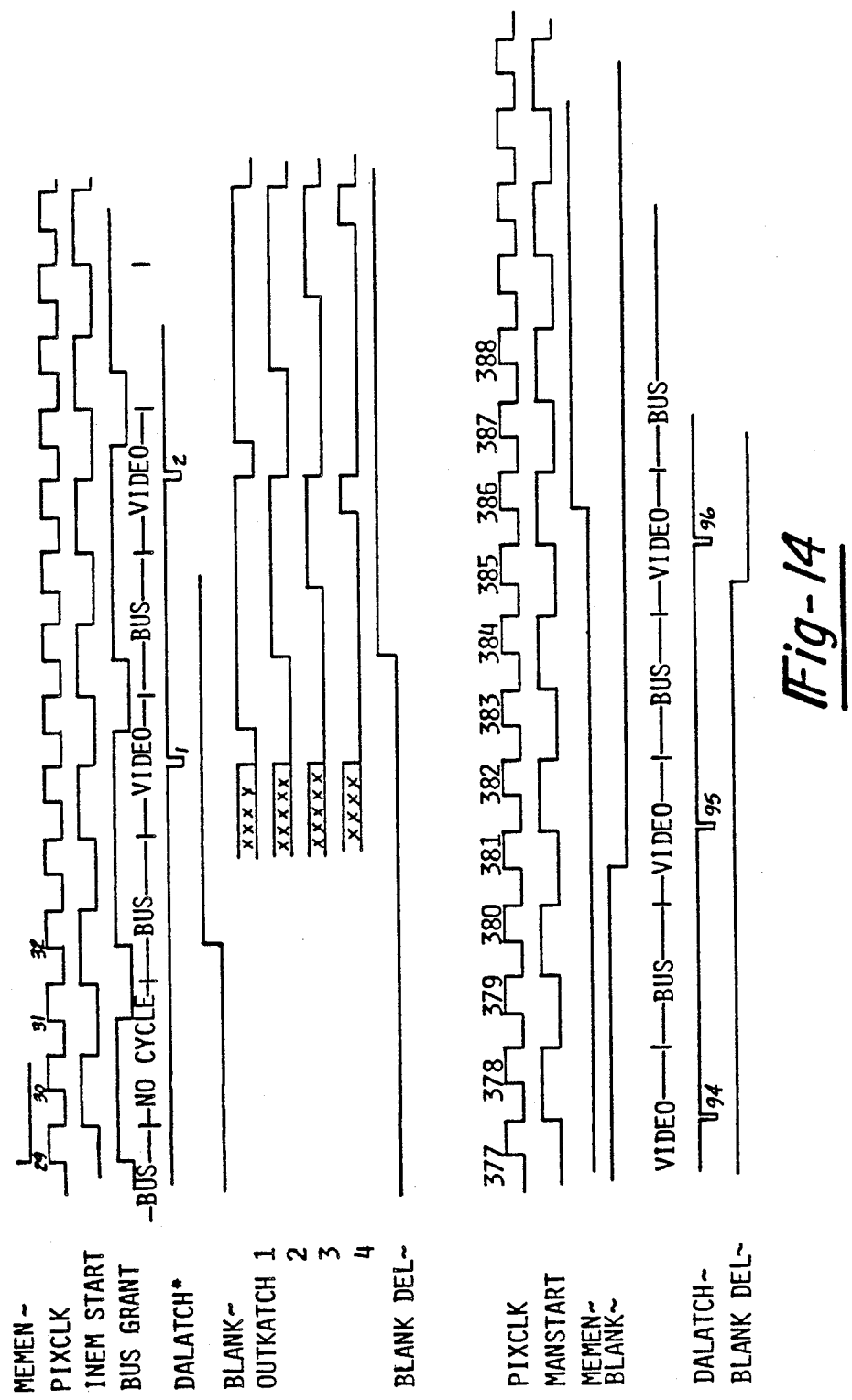
FIG. 14 is a timing diagram useful in explaining the outlatch circuit of the sequencer circuit.

Because the acquisition of video data occurs at such a rapid rate, special processing steps are needed in order to allow the comparatively slower acting memory circuits and digital to analog conversion circuits to operate. This is accomplished using the inlatch and outlatch circuits 116 and 122. FIG. 14 illustrates the manner in which these circuits operate. Basically, the memory circuit stores a long word of four bytes. As these bytes are digitized, they are sent to the inlatch circuit which the memory can access at its own rate. The reverse occurs when data is sent to the D to A converter. A long word of four bytes is latched in the outlatch circuit, which the D to A converter can access at its own rate.

FIG. 14 illustrates four outlatch signals which strobe the four bytes of data into the D to A converter. A similar scheme is used to accommodate the inlatch circuit. As seen, it is possible for the processor to execute a bus cycle while the four bytes are being strobed from the outlatch. This speeds up the operation of the processor-controlled operations significantly.

Figure 15:
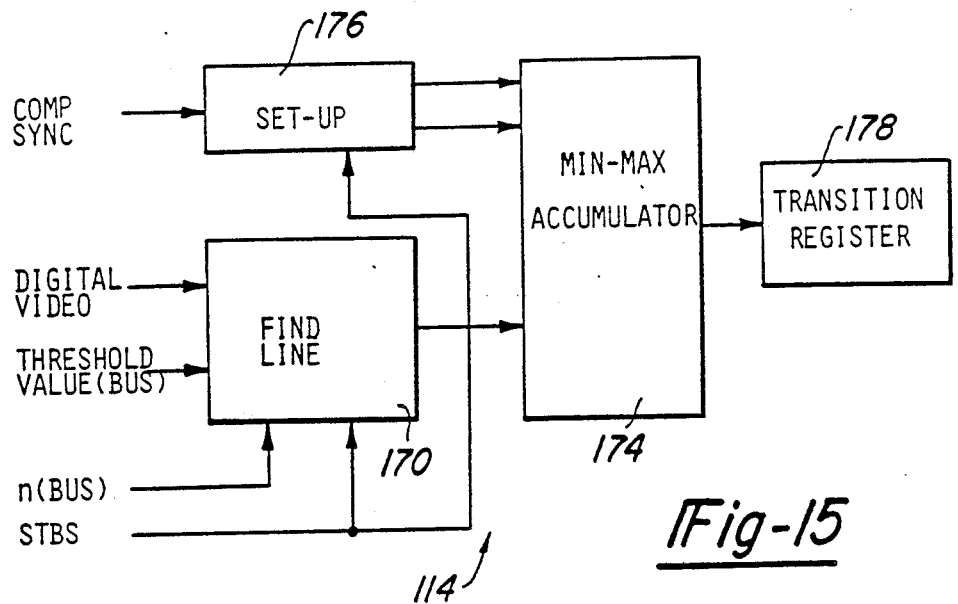
FIG. 15 is a block diagram of the transition detector of the sequencer circuit.

Another technique which minimizes processor overhead is implemented by the transition detector circuit 114. The transition detector circuit is shown in detail in FIG. 15. In order to measure the toe-in alignment of the wheel, it is necessary to determine a reference line which lies in the plane of the wheel, i.e., parallel to the wheel's centerline. Preferably the reference line is parallel to the ground plane. The presently preferred approach is to locate two radially equivalent points on the surface of the tire which correspond to the points closest to the sensor modules (i.e., the "crown" in the tire sidewall), ignoring any raised lettering. Because the tire is generally toroidal in shape, the crown occurs somewhere between the tread and the rim, often in the region where raised lettering may occur. The transition detector circuit greatly speeds up the process by which this closest point on the tire is found. Other techniques described below are used to ignore the effects of raised lettering which may occur on the portion of the tire closest to the sensor modules.

Figure 16:
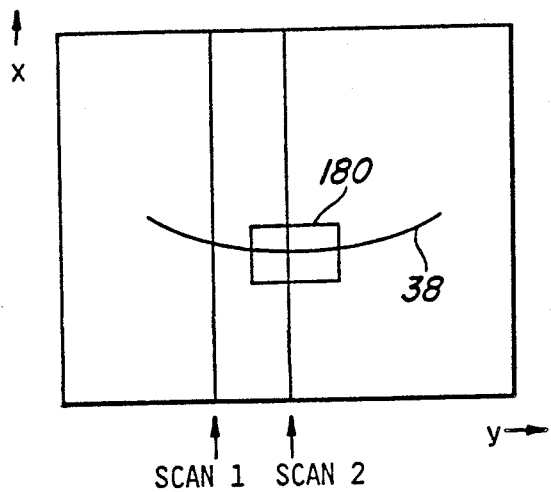
FIG. 16 is a representation of the image data perceived by the optical sensor of the invention.

Referring to FIG. 16, contour line 38 is shown in an X-Y coordinate system. The Y dimension corresponds to video rows or scan lines in the video frame. The X coordinates coorespond to columns or pixels in the video frame. The presently preferred embodiment orients the contour line 38 so that successive scan lines, such as SCAN 1 and SCAN 2 intersect it. This is accomplished by rotating the video camera 90 degrees with respect to the laser plane, so that the camera scans substantially perpendicular to the laser plane. As each scan of the video frame occurs, the intensity information at each pixel location is digitized for storing in the video memory circuits 118.

Figure 17:
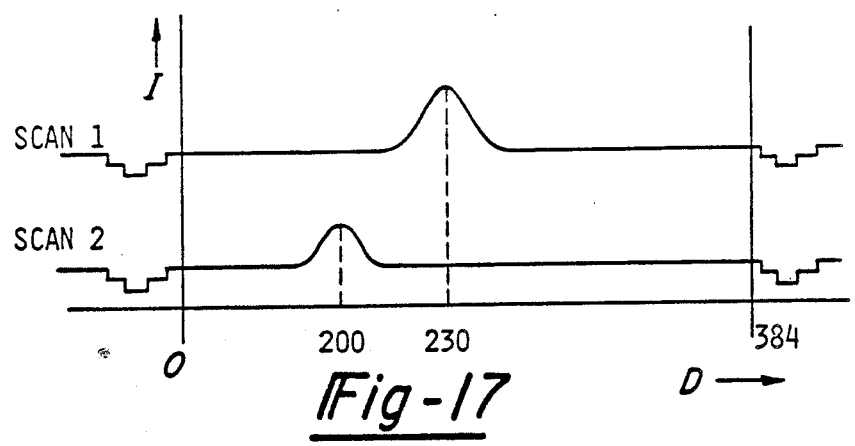
FIG. 17 is a graph of optical intensity as a function of distance from the laser light source for two exemplary scan lines of data depicted in FIG. 16.
Figure 18:
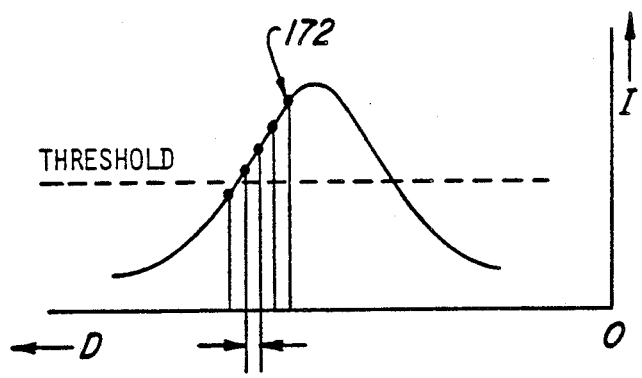
FIG. 18 is an enlarged graph of one of the two intensity patterns of FIG. 17 with the distance scale along the abscissa being reversed relative to FIG. 17.

In finding the point closest to the sensor module, the circuit could search through the entire array of digitized pixel information, however this would take a great deal of processor time and render the response time of the system unacceptably slow. The transition detector circuit avoids this problem by monitoring the digital video data stream simultaneously as it is being written to memory. The digital video data stream is input to a threshold comparator circuit designated as the find line circuit 170. The find line circuit is also furnished with a threshold value against which the incoming digital video data is compared. FIGS. 17 and 18 illustrate what happens conceptually in the find line circuit. FIG. 17 depicts the two arbitrary scan lines SCAN 1 and SCAN 2 of FIG. 16. Both scan lines reach an intensity peak at a given pixel location corresponding to the intersection of the scan line with the contour line 38. In the example of FIG. 17, SCAN 1 intersects at pixel 230 while SCAN 2 intersects at pixel 200. This indicates that SCAN 2, having a lower pixel intersection number, is closer to the sensor module than SCAN 1.

FIG. 18 is an enlargement of either SCAN 1 or SCAN 2. The threshold value input over the bus to the find line circuit is illustrated as a horizontal dashed line. Once the intensity level exceeds the threshold, a predetermined number of consecutive pixels above the threshold are counted before the intersection is declared to be found. This predetermined number is input from the bus to the find line circuit as value n in FIG. 15. Assuming n=4, the declared intersection point 172 is the fourth consecutive pixel above the threshold. This declared intersection point would correspond to a value of 230 for the exemplary SCAN 1 and a value of 200 for the exemplary SCAN 2.

This declared intersection point is then strobed into a min-max accumulator 174 along with the scan line number. The min-max accumulator compares the input declared intersection point value with an initialized value, determined by set-up block 176 or with a previously stored value. If the newly input intersection point value is smaller than the stored value, the newly input intersection point value and its corresponding scan line number is stored in the min-max accumulator. If the intersection point value is not smaller than the stored value, the newly input value is discarded and the existing stored value remains. In this fashion, as each scan line occurs, the min-max accumulator automatically retains the row and column location of the intersection corresponding to the point closest to the sensor module. After the video frame is completed, the row and column value stored in the min-max accumulator is written to a transition register 178. The transition register may be read by the processor to quickly determine the probable location of the point closest to the sensor module. A window may then be conceptually drawn around this point so that further computation can focus on the crucial portion of the contour line. See window 180 in FIG. 16.

Figure 20:
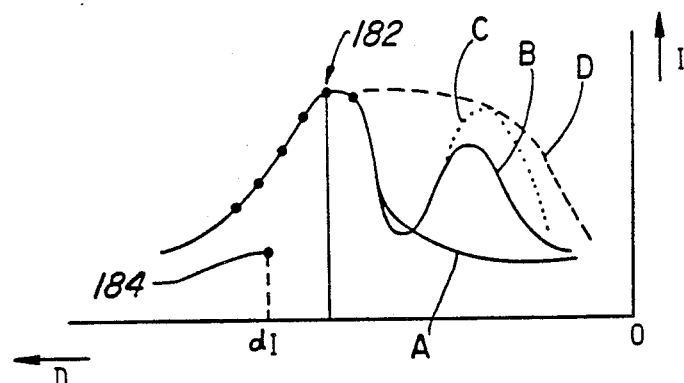
FIG. 20 is a graph of optical intensity similar to FIG. 18 illustrating a preferred algorithm for eliminating measurement error due to tire sidewall lettering.

As mentioned above, it is possible that the portion of the crown in the tire sidewall may have raised lettering thereon. The presently preferred embodiment employs an algorithm to ignore the raised lettering and to instead locate the plane of the tire sidewall in relation to the portion which does not contain lettering. This is accomplished by allowing the video camera to accumulate intensity readings over an entire wheel revolution. FIG. 20 compares the illumination intensity return from a tire without raised lettering (curve A) with three different possible returns caused when raised lettering is present. Curve B exemplifies a return from the raised lettering which is lower in intensity than the return from the tire sidewall. Curve C exemplifies the case in which the return from the raised lettering and from the sidewall are approximately equal in intensity. Curve D exemplifies the situation in which there is no appreciable dropoff in intensity due to a gap between raised lettering and the tire sidewall. In every case, because the plane of the raised lettering is closer to the sensor module than the plane of the sidewall, light reflected from the raised lettering will appear closer to the origin 0 in FIG. 20. The invention advantageously utilizes this fact to locate a point (used to represent tire location) which lies on the portion of the intensity curve to the left of the leftmost peak and which is thus not based on any intensity return from raised lettering.

One presently preferred technique for accomplishing this is illustrated in FIG. 20. FIG. 20 depicts a double-peaked return; the higher intensity peak corresponds to the return from the sidewall body and the lower intensity peak (closer to the origin 0) corresponds to the return from the raised lettering. The processor evaluates individual pixel values starting from a position farthest from the origin 0 and determines where the value ceases to rise and hence has reached first intensity peak 182. All pixel data beyond this point is ignored and a center of gravity calculation is performed to find the center of gravity 184 of the data occurring on the side of the intensity peak farthest from the origin 0. The center of gravity may be calculated by multiplying the intensity value with the row position value D of each point, summing all values so calculated, and dividing the sum by the sum of the intensities of those points. This calculation gives an average row position d1 which can be used to represent the location of the portion of the tire sidewall closest to the sensor module. By such a calculation, the effects of any raised lettering are eliminated. Although the center of gravity may not in fact represent the point of closest proximity to the sensor, the same center of gravity calculation is performed at all angular positions around the circumference of the tire and gives good, consistent results.

Another technique for locating the closest point on the tire while ignoring raised lettering, may be to simply count a predetermined number of pixels past the threshold crossing point and use those points to do a center of gravity calculation. The center of gravity calculation gives a repeatable data point at sub-pixel resolution. The number of pixels counted should be selected so that the datum point does not fall in the region of raised lettering.

A third technique for determining the point of closest proximity is to select the point which represents the greatest rate of change of intensity information on the upside of the first peak.

Figure 19:
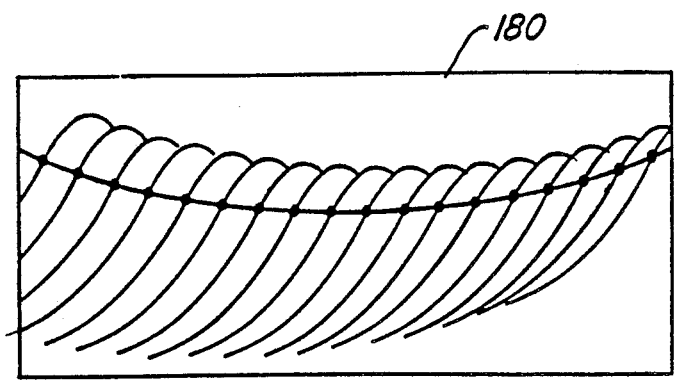
FIG. 19 is a graph depicting a plurality of overlayed received intensity curves with center of gravity points indicated, useful in illustrating the algorithm by which data points are selected.

The point of closest proximity is calculated by one of the above methods for each scan line within the window 180. FIG. 19 conceptually illustrates each of the closest proximity points of consecutive scan lines within window 180. The processor then determines a final value by averaging a plurality of these closest proximity points, and that average value is used to represent one data point on the surface of the tire as measured by one of the sensor modules. A similar process is performed for the other sensor module or modules, giving two points at different radially equivalent locations on the tire through which a line may be drawn for toe-in calculations. A third point may be similarly determined from which camber can be checked.

The data points discussed so far represent row and column values in the video frame (image space). In order to relate these row and column values to points in real space, a rectification table or lookup table may be used. A rectification table is a lookup table in processor memory which has been previously filled with values during calibration, mapping image space to real space. Image space values which occur between recorded values in the lookup table are converted into real space coordinates by interpolation.

While a rectification table of this type may be used, the presently preferred embodiment employs a fifth order polynomial equation which gives real space coordinates as a function of image space coordinates. The polynomial function may be determined by measuring multiple data points of known real space location in a manner used to fill a lookup table. The values are then operated on by a curve fitting algorithm to provide a polynomial equation. A fifth order polynomial equation has been found to give good results, although other types of equations may also be useful in certain applications.

Figure 21:
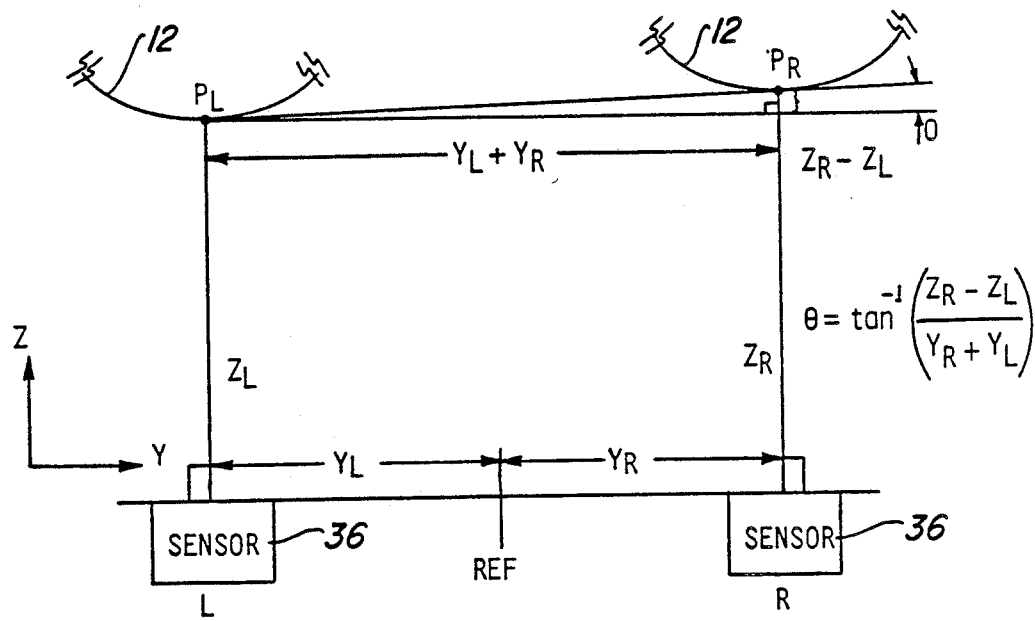
FIG. 21 is a sketch illustrating how toe-in angle is determined trigonometrically from measured (y,z) data.

Once two points in real space have been found, corresponding to two points along a horizontal line on the tire, the toe-in is easily computed using trigonometry. Referring to FIG. 21, the left and right sensor modules 36 are illustrated together with a portion of the tire 12. Each sensor is a predetermined distance from a reference point REF. The distances are designated $Y_L$ and $Y_R$. The spacing between the left and right data points $P_L$ and $P_R$ is therefore $Y_L + Y_R$. The real space position of points $P_L$ and $P_R$ in the Z direction are the measured values $Z_L$ and $Z_R$ determined by the conversion from image space data to real space data. If the points $P_L$ and $P_R$ do not have the same Z coordinates, then there is a nonzero toe-in angle. This angle is determined by trigonometry as the arc tangent of the difference $(Z_R - Z_L)$ divided by the sum $(Y_R + Y_L)$.

Once this toe-in angle has been computed, it may be compared with preestablished tolerances for quality control checking. The angle may also be fed to the digital to analog converter board 98 (FIG. 8) for conversion into an analog signal for driving the alignment meters 50. In the presently preferred embodiment, the meters are driven in a nonlinear fashion whereby the greatest accuracy is achieved when the toe-in angle nears zero. When the toe-in angle is far from zero, the meter sensitivity is decreased so that comparatively large changes in toe-in can be made without similarly large excursions of the alignment meter. Once the toe-in angle approaches the proper setting, the sensitivity of the meter is increased so that a precise setting can be made.

Figure 24:
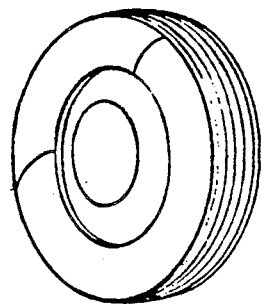
FIG. 24 depicts an alternate method of determining toe-in, chamber and caster.

The preferred embodiment has been described in an application where the toe-in alignment is measured by finding two points along a horizontal line on the tire. It will be understood, however, that comparable results can be achieved by projecting structured light to illuminate contour lines lying generally along a line which forms a nonperpendicular angle with the horizontal. For example, the structured light can be projected to illuminate contour lines which lie on a line disposed 45 degrees with respect to the horizontal. In such a case, the resulting data can be broken down into a horizontal component and a vertical component. The horizontal component can be used to calculate the toe-in alignment and the vertical component can be used to calculate the camber. By steering the wheel to determine the plane of the wheel in two steered orientations, the caster can also be determined. Thus the invention is capable of determining toe-in, camber and caster from a single pair of contour lines. In the present embodiment, this can be accomplished using two sensor modules positioned to illuminate two contour lines disposed along a diagonal relative to the horizontal. This is illustrated in FIG. 24 where the diagonal line is indicated at D and the contour lines are indicated at 38.

The present invention provides considerably more resolution and accuracy than the analog meter is capable of conveying. Thus the digital data provided by the apparatus may be used in critical applications, such as providing audit data for quality control purposes or for driving robotic wheel alignment equipment. Digital readouts may also be used in place of the analog meter. The analog meter is presently preferred because it provides a simple to understand computer-to-human interface. Combinations of analog and digital readouts may also be employed.

While the invention has been described largely in connection with a toe-in alignment system, the invention is capable of measuring camber, caster and other aspects of alignment, including vehicle body alignment and front and rear wheel alignment using the techniques described herein.

While the invention has been described in connection with its presently preferred embodiment, it will be understood that the invention is capable of certain modification and change without departing from the spirit of the invention as set forth in the appended claims.

What is claimed is:

1. A system for measuring a predetermined alignment characteristic of a wheel defining a plane normal to the axis of the axle of the vehicle on which the wheel is mounted, comprising:

means for establishing a predetermined target associated with the wheel that defines the position and orientation of said plane in three-dimensional space;

optical sensor means having associated therewith a field of view and being positioned relative to wheel so that said target is located within said field of view for creating an image of said target and converting said image to corresponding electrical signals;

processor means for processing said electrical signals, determining therefrom the position and orientation of said plane in three-dimensional space relative to a predefined datum, and calculating therefrom said predetermined alignment characteristic of said wheel.

2. A method of measuring a predetermined alignment characteristic of a wheel defining a plane normal to the axis of the axle of the vehicle on which the wheel is mounted, comprising the steps of:

optically creating a predefined target associated with said wheel that defines the position and orientation of said plane;

optically sensing the position and orientation of said target and determining therefrom the position and orientation of said plane in three-dimensional space relative to a predefined datum; and calculating therefrom said predetermined alignment characteristic of said wheel.

3. A system for measuring a predetermined alignment characteristic of a wheel defining a plane normal to the axis of an axle of the vehicle on which the wheel is mounted comprising:

means for optically creating a predefined target associated with said wheel that defines the position and orientation of said plane;

optical sensing means for measuring the position in three-dimensional space of said target; and processor means responsive to said optical sensing means for calculating said predetermined alignment characteristic of said wheel.

* * * * *

UNITED STATES PATENT AND TRADEMARK OFFICE
CERTIFICATE OF CORRECTION

PATENT NO. : 4,899,218
DATED : February 6, 1990
INVENTOR(S) : Thomas J. Waldecker et al.

It is certified that error appears in the above-indentified patent and that said Letters Patent is hereby corrected as shown below:

ON THE TITLE PAGE, under "Inventors:", after "Richard Woroniec, West Bloomfield Township, Oakland County", delete "," and insert --; Amnon Sitchin, West Bloomfield,--

Signed and Sealed this

Twenty-fifth Day of July, 1995

Attest:

BRUCE LEHMAN

Attesting Officer

Commissioner of Patents and Trademarks